(12) United States Patent
Mandel

(10) Patent No.: US 9,931,683 B2
(45) Date of Patent: Apr. 3, 2018

(54) METHOD OF ASSEMBLY USING MAGNETIC CRIMPING

(71) Applicant: ADM28 S.ar.l., Luxembourg (LU)

(72) Inventor: Eric Mandel, St Quentin (FR)

(73) Assignee: ADM28 S.À.R.L, Luxembourg (LU)

( * ) Notice: Subject to any disclaimer, the term of this patent is extended or adjusted under 35 U.S.C. 154(b) by 349 days.

(21) Appl. No.: 14/651,908

(22) PCT Filed: Dec. 11, 2013

(86) PCT No.: PCT/EP2013/076284
§ 371 (c)(1),
(2) Date: Jun. 12, 2015

(87) PCT Pub. No.: WO2014/090902
PCT Pub. Date: Jun. 19, 2014

(65) Prior Publication Data
US 2015/0314358 A1    Nov. 5, 2015

(30) Foreign Application Priority Data

Dec. 13, 2012  (FR) .................................... 12 62026

(51) Int. Cl.
*B23K 20/06* (2006.01)
*B21D 26/14* (2006.01)
(Continued)

(52) U.S. Cl.
CPC ............ *B21D 26/14* (2013.01); *B21D 39/00* (2013.01); *B21D 51/24* (2013.01); *B23K 20/06* (2013.01);
(Continued)

(58) Field of Classification Search
CPC ........ B21D 26/14; B21D 39/00; B21D 51/24; B65D 53/06; F17C 13/06;
(Continued)

(56) References Cited

U.S. PATENT DOCUMENTS 2,867,358 A    1/1959  Philip
2009/0134147 A1*  5/2009  Gafri ...................... B23K 20/06
                                                    219/617

FOREIGN PATENT DOCUMENTS

BE    676 306 A    6/1966
GB    1073763 A *  6/1967 ............. B21D 51/34
(Continued)

OTHER PUBLICATIONS

International Search Report, dated Apr. 4, 2014, from corresponding PCT application.

*Primary Examiner* — Sarang Afzali
*Assistant Examiner* — Ruth G Hidalgo-Hernandez
(74) *Attorney, Agent, or Firm* — Young & Thompson

(57) ABSTRACT

A method of assembling a first part (1) with a second part (2) having at least one crimping lip (4), a crimping anvil (3) and a crimping groove (9) designed to accept an edge (10) that is to be crimped belonging to the first part, in which method the edge that is to be crimped is introduced into the crimping groove and magnetic crimping is performed by applying to the crimping lip a magnetic field that is designed to bend the crimping lip over and close the crimping groove onto the edge that is to be crimped, characterized in that the crimping anvil has at least one inclined portion.

12 Claims, 3 Drawing Sheets

(51) Int. Cl.
*B65D 53/06* (2006.01)
*B21D 39/00* (2006.01)
*B21D 51/24* (2006.01)
*F17C 13/06* (2006.01)
*B23K 101/12* (2006.01)

(52) U.S. Cl.
CPC ............. *B65D 53/06* (2013.01); *F17C 13/06* (2013.01); *B23K 2201/125* (2013.01); *F17C 2201/0119* (2013.01); *F17C 2203/0617* (2013.01); *F17C 2209/234* (2013.01); *F17C 2223/0123* (2013.01); *Y10T 29/49917* (2015.01)

(58) Field of Classification Search
CPC ........ F17C 2203/0617; F17C 2209/234; F17C 2223/0123; F17C 2201/0119; B23K 20/06; B23K 2201/125; Y10T 29/49917
See application file for complete search history.

(56) References Cited

FOREIGN PATENT DOCUMENTS

| | | |
|---|---|---|
| GB | 2 275 920 A | 9/1994 |
| WO | 2007/132468 A1 | 11/2007 |

\* cited by examiner

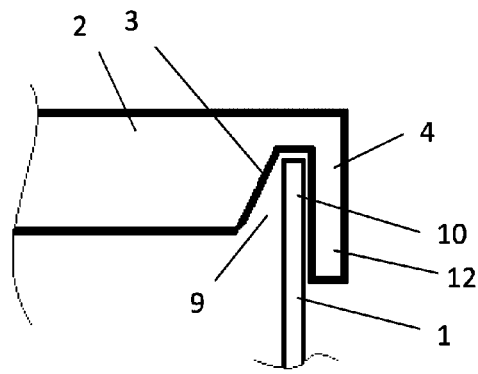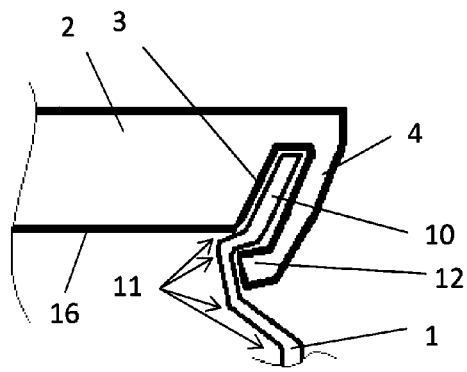
Fig. 2a　　　　　　　　　　Fig. 2b
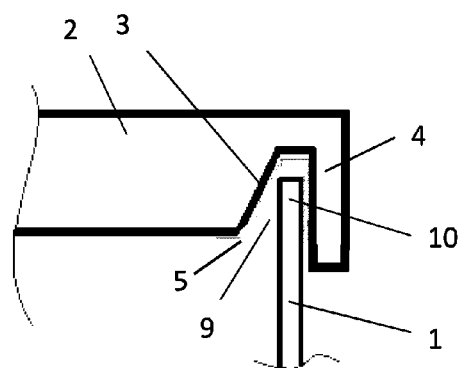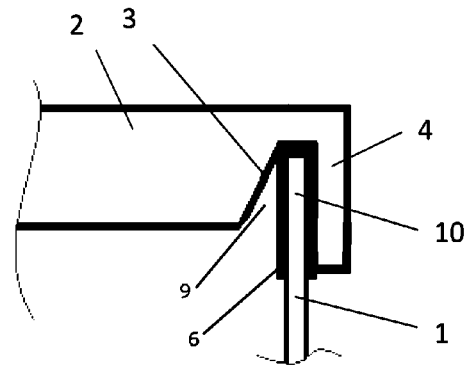
Fig. 3　　　　　　　　　　Fig. 4
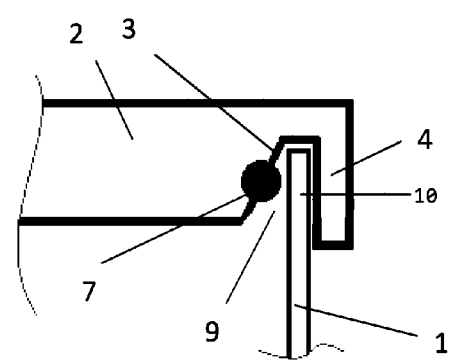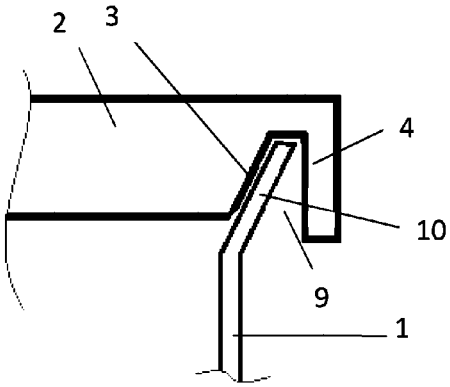
Fig. 5　　　　　　　　　　Fig. 6

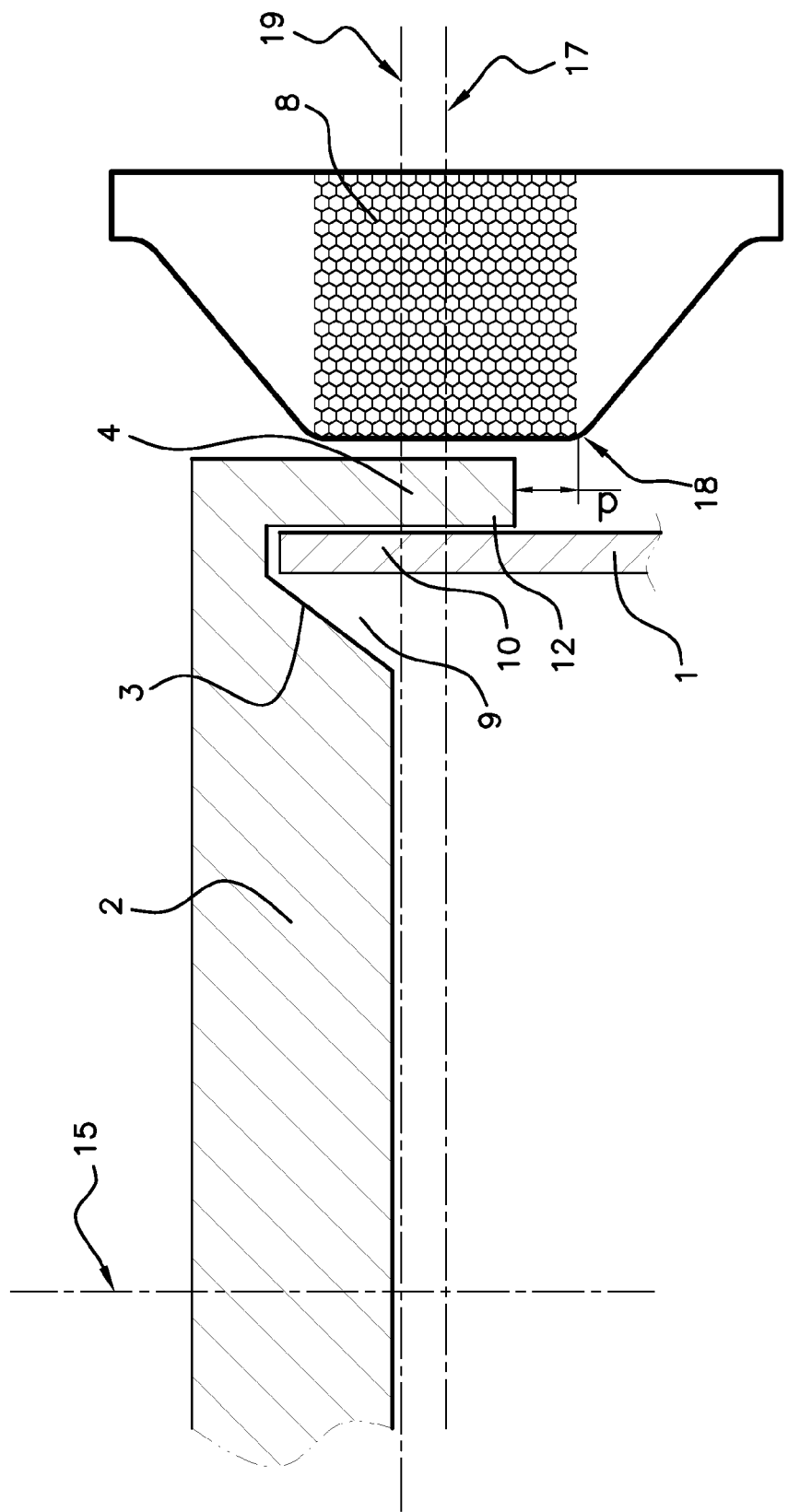

METHOD OF ASSEMBLY USING MAGNETIC CRIMPING

The invention relates to a method for assembling two parts using magnetic crimping, in particular the magnetic crimping of a metallic cover onto a receptacle, and to an assembly obtained by such a method.

In various applications the object is to assemble a base and a cover onto a cylindrical part in order to close said part and to form a container for storing liquids or gases, in particular pressurised liquids or gases. In particular, the object is to mount a cover onto a receptacle in a hermetically sealed manner.

A method for crimping covers onto receptacles using magnetic crimping is already known. Thus, the document WO 2007/132468 discloses a method wherein the end of a cylindrical shaped receptacle is introduced into the circular groove of a cover, with the edge of the cover being deformed by a magnetic impact in order to crimp the cover onto the receptacle. Such a method allows a closed, in particular a hermetically sealed container to be obtained.

However, such a method, and the assembly obtained by such a method, has disadvantages. Indeed, such closed containers are generally intended to receive a pressurised gas or liquid or a partial vacuum such that the assembly between the receptacle and the cover experiences traction forces along the axis of the container that tend to separate or bring together the cover and the receptacle. However, the end of the receptacle is simply radially crimped in the crimped groove of the cover. Therefore, only the friction forces between the cover and the receptacle oppose their axial displacement.

Furthermore, in such a method, the free end of the crimping lip significantly rubs against the receptacle during magnetic crimping, causing a weld and not the simple crimping of the cover onto the receptacle. The localised result of this effect is a degradation in the qualities of the receptacle, in particular the thickness of the receptacle, and possibly the tearing of an external protective layer of the receptacle.

Furthermore, with such a method, the assembly that is obtained has an unsightly seam on the periphery of the cover.

The object of the invention is to overcome these disadvantages.

Therefore, the object of the invention is to propose a method for assembling two parts, in particular a receptacle and a cover, allowing an assembly to be obtained that is particularly resistant to relative longitudinal forces that are particularly imparted by a pressurised fluid contained in the container or by a partial vacuum isolated in the container from an external pressure.

A further object of the invention is to propose such a method that allows a container to be obtained that is hermetically sealed to gases and liquids.

A further object of the invention is to propose such a crimping method that is quick and therefore allows a high rate of production.

A further object of the invention is to propose such a method that allows a particularly aesthetic container to be obtained.

A further object of the invention is to propose a method that can be implemented on existing magnetic crimping machines.

Throughout the document, "magnetic crimping" refers to the technique of deforming an electrically conducting part on another part by generating a magnetic pulse in the vicinity of the electrically conducting part and by the effect of Laplace forces on the current load carriers induced in the electrically conducting part by the magnetic pulse.

Furthermore, throughout the document the "orientation" of a free surface of a part conventionally refers to a direction and a path corresponding to a line perpendicular to a tangent plane of this free surface, oriented outwards from this surface.

Therefore, the invention relates to a method for assembling, in at least one direction, called direction of traction,
  a first part having an edge, called crimping edge, extending to an end of said first part in the direction of traction,
  and a second part having:
    a lip, called crimping lip, at least partly made up of an electrically conducting material;
    a stop, called crimping stop, extending opposite and remote from an inner side of the crimping lip, providing a groove, called crimping groove, which groove is:
  open in the direction of traction;
  adapted to receive said crimping edge of the first part, wherein:
    the crimping edge of the first part is introduced into the crimping groove of the second part in said direction of traction;
    then magnetic crimping is carried out by applying a magnetic field variation to the crimping lip that is adapted to fold the crimping lip without winding and to plastically deform the crimping lip towards the crimping stop, so as to close the crimping groove onto the crimping edge of the first part,
  wherein the crimping stop has at least one portion that is inclined relative to the direction of traction.

More specifically, the invention relates to a method for assembling, in at least one direction, called direction of traction,
  a first part having an edge, called crimping edge, extending to an end of said first part in the direction of traction,
  and a second part having:
    a lip, called crimping lip, at least partly made up of an electrically conducting material;
    a stop, called crimping stop, extending opposite and remote from an inner side of the crimping lip, providing a groove, called crimping groove, which groove is:
  open in the direction of traction;
  adapted to receive said crimping edge of the first part, wherein:
    the crimping edge of the first part is introduced into the crimping groove of the second part in said direction of traction;
    then magnetic crimping is carried out by applying a magnetic field variation to the crimping lip that is adapted to fold the crimping lip without winding and to plastically deform the crimping lip towards the crimping stop, so as to close the crimping groove onto the crimping edge of the first part,
  wherein:
    the crimping stop has at least one portion that is inclined relative to the direction of traction;
    said crimping lip is longer than the depth of the crimping groove;
    during magnetic crimping a free end of the crimping lip is folded against a face, called inner face, of the second part, said inner face being distinct from the crimping stop, so that the crimping edge has a portion in abutment against said inner face, on the one hand, and in abutment against the free end of the crimping lip, on the other hand. The crimping groove extends, in profile, between said side of the crimping lip and the crimping stop. The profile is a section view through a plane comprising the direction of traction, for example, a radial plane in the case of cylindrical parts.

Furthermore, advantageously and as claimed in the invention, the crimping stop is oriented in a direction forming an angle different from 90° with said direction of traction.

In particular, the crimping stop is oriented in a direction forming an angle of more than 20° with said direction of traction and, more specifically, an angle between 30° and 45°.

More specifically, the crimping lip and the crimping stop are adapted so that, after crimping, at least one contact surface portion between the crimping lip and the crimping edge is oriented in a direction that is inclined, in particular forming an angle different from 90°, relative to said direction of traction.

The invention also allows an assembly to be obtained wherein the surfaces in contact of the crimping edge and the crimping stop are inclined relative to a direction of traction, along which the first and the second part are expected to undergo traction forces relative to each other. The invention also allows an assembly to be obtained wherein surfaces in contact of the crimping edge and the crimping lip are inclined relative to a direction of traction, along which the first and the second part are expected to undergo traction forces relative to each other.

In a method and an assembly as claimed in the invention, the crimping lip, in profile, is longer in the direction of traction than the depth of the crimping groove in the direction of traction.

The crimping lip therefore extends beyond the opening of the crimping groove. Thus, when the crimping lip is folded over the crimping edge, only one portion of the crimping lip is stopped by the crimping stop. The free end of the crimping lip is not stopped by the crimping stop as it extends beyond said crimping stop so that, during crimping, it continues its course and drives the crimping edge of the first part beyond the crimping groove, causing additional localised deformation of the crimping edge.

During crimping, the free end of the crimping lip advantageously is folded against a face, called inner face, of the second part. Said inner face forms an angle with the crimping stop. A portion of the crimping edge is therefore deformed and clamped between the inner face and the free end of the crimping lip.

Said inner face comprises at least one flat portion that is orthogonal to the direction of traction, said portion receiving the free end of the crimping lip during crimping. This portion is a peripheral portion of the inner face when the first part has a closed contour, in particular it is annular when the first part is cylindrical. Said inner face is, advantageously and as claimed in the invention, flat and orthogonal to the direction of traction.

Such a crimping lip, which is longer than the depth of the crimping groove, allows additional stops to be created between the first part and the second part, with a different orientation of the stops between the crimping edge and the crimping stop and between the crimping lip and the crimping edge. In particular, such a feature improves the resistance to traction forces in the direction of traction, in both directions.

Advantageously and as claimed in the invention, the stop between the crimping edge and the inner face is orthogonal to the direction of traction and the stop between the crimping edge and the free end of the crimping lip is orthogonal to the direction of traction. More specifically, the stop between the crimping edge and the inner face is flat and orthogonal to the direction of traction and the stop between the crimping edge and the free end of the crimping lip is flat and orthogonal to the direction of traction.

Therefore, the traction resistance of the assembly between the first part and the second part is high. Indeed, reaction forces, and not only friction forces between the first part and the second part, occur on the surfaces in abutment with each other.

Advantageously, in a method according to the invention, before the step of introducing the crimping edge into the crimping groove, the crimping groove is formed in the second part in a shape that mates with that of the crimping edge of the first part.

Advantageously, the crimping groove is formed in the vicinity of an edge of the second part so that the second part has, on one side of the crimping groove, a solid part that is limited by the crimping stop and, on the other side of the crimping groove, a crimping lip extending, in profile, between the crimping groove and an outer face of the second part. Thus, with the crimping stop being an outer surface of a solid portion of the second part, advantageously it is not deformed by the impact of the crimping lip and the crimping edge during the crimping step.

Furthermore, advantageously and as claimed in the invention, the crimping stop has an incline relative to the direction of traction such that, in profile, the opening of the crimping groove is wider than the bottom of the crimping groove.

The width, which is defined by the distance between the crimping stop and the crimping lip, of the opening of the crimping groove is greater than the width of the bottom of the crimping groove. This allows the crimping edge to be introduced into the crimping groove easily and without force.

The fact that the bottom of the crimping groove is narrow allows better quality and more aesthetic crimping to be obtained.

Advantageously and as claimed in the invention, the crimping groove has a trapezoidal profile.

In particular, advantageously, the inner face of the crimping lip extends in the direction of traction, the bottom of the crimping groove extends perpendicular to the direction of traction and the crimping stop forms a non-zero angle relative to the direction of traction. Thus, in profile, the bottom of the crimping groove that is obtained is narrower than the opening of the crimping groove.

More specifically, the bottom of the crimping groove is advantageously the same width as the thickness of the crimping edge introduced into the crimping groove.

The crimping lip has, in profile, a zone, called foot, through which it is connected to the rest of the second part, and a portion protruding from said foot, which has a free end.

During magnetic crimping, the crimping lip, but not the crimping lip foot, which remains at a predetermined distance from the crimping stop, is folded against the crimping edge towards the crimping stop.

Indeed, the difference in thickness between the crimping edge and the bottom of the crimping groove allows the crimping lip to be displaced as orthogonally as possible to the surface of the first part, with minimal rotation of the crimping lip about its point of attachment to the second part.

In particular, the crimping lip does not have double turns in the opposite direction after crimping, but only one or two turns in the same direction.

During the magnetic crimping step, the magnetic pulse (duration and intensity) is selected so that the crimping edge is also displaced under the effect of the deformation of the crimping lip until the crimping edge makes contact with the crimping stop. A portion of the first part, located in the vicinity of the crimping edge, is therefore deformed.

Advantageously, the first part is held in position during the crimping step.

Advantageously, the crimping edge has a closed contour, which is cylindrical, for example.

However, in the case of a crimping edge that is a closed contour, the forces imparted by the crimping lip during crimping are distributed to the periphery of the contour and are compensated so that the first part does not need to be held in position.

Advantageously, in the embodiments of the invention wherein the first part has a crimping edge with a closed contour, according to the invention, the stops created by clamping a first portion of the crimping edge between a non-end part of the crimping lip and the crimping stop are radially outside of the stops created by clamping a second portion of the crimping edge between the free end of the crimping lip and the inner face of the second part. This is particularly the case for first and second cylindrical parts.

Therefore, according to the invention, the first part does not have a collar, in particular the crimping edge does not have a collar, for creating stops orthogonal to the direction of traction. Such stops are created within the overall dimensions of the first part so that the assembly obtained according to the invention is particularly aesthetic.

Advantageously, before crimping, the crimping edge has a face, at least one portion of which is a complementary shape of at least one portion of the crimping stop. Therefore, when the crimping edge is introduced into the crimping groove, the crimping edge makes direct contact with the crimping stop.

Advantageously, the thickness of the crimping edge is constant.

Furthermore, the crimping lip is at least partly made up of a good electrically conducting material. In particular, the crimping lip advantageously comprises at least one continuous layer of a good electrically conducting material.

More specifically, the crimping lip advantageously is at least partly made up of a material with electrical conductivity of more than $5 \times 10^6 S \cdot m^{-1}$.

Furthermore, the crimping lip is at least partly made up of a material with relative magnetic permeability that is close to 1. Therefore, the penetration of the magnetic field of the magnetic crimping pulse into the crimping lip is not particularly deep (the skin thickness of the skin effect caused in the crimping lip is low), which allows high pressure and high speed to be obtained on the crimping lip when crimping and therefore a reliable and robust mechanical assembly to be provided.

Therefore, the crimping lip is advantageously selected from non-magnetic (with relative magnetic permeability equal to 1), paramagnetic and diamagnetic (with relative magnetic permeability close to 1) materials.

Advantageously and according to the invention, a seal is introduced between the crimping edge and the crimping groove, said seal being adapted to extend over the entire length of the crimping edge. Advantageously, said seal is introduced between the crimping edge and the crimping groove before the crimping lip is magnetically crimped onto the crimping edge. Advantageously, the seal is disposed between a side of the crimping edge and a side of the crimping groove, i.e. between a side of the crimping edge and the crimping lip or between a side of the crimping edge and the crimping stop. Advantageously, the seal is selected from a material that is softer than the crimping edge and the crimping lip (and the crimping stop, respectively). Thus, the seal is deformed by being crushed between a side of the crimping groove and the crimping edge, thus providing a seal between the first part and the second part.

In a method according to the invention, the crimping groove advantageously has a slot and a seal is advantageously mounted in said slot. Advantageously and according to the invention, the slot is provided in the crimping groove before said seal is mounted. More specifically, the slot is advantageously provided in the crimping stop.

Advantageously, the crimping groove has a generally trapezoidal profile and, locally, has variations in shape that are associated with technical requirements. For example, the crimping stop and/or the crimping lip and/or the bottom of the crimping groove can have one or more slots that each allow one or more seals to be mounted between the crimping groove of the second part and the crimping edge of the first part.

Such a seal improves the fluidic seal of the crimped assembly according to the invention, between the first part and the second part.

In the particular case of assembling a second part with a circular shaped crimping groove onto a cylindrical crimping edge, the slot in the crimping stop is adapted to receive an O-ring seal.

Furthermore, advantageously and as claimed in the invention, a film is interposed between the crimping edge and the crimping groove.

Advantageously, such a film is inserted between the crimping edge and the crimping groove before the crimping edge is introduced into the crimping groove.

Such a film can allow a fluidic seal to be provided between the first and the second part and can be mounted on its own or in combination with a seal as described above.

Advantageously, such a film comprises at least one layer of electrically isolating material. Advantageously, the film is formed by a dielectric polymer material. Such an isolating film allows the first part to be electrically isolated from the second part. Thus, such a film allows oxidation-reduction reactions to be avoided between the first and the second part, thus allowing assemblies to be produced in which the first part and the second part are made of metallic materials comprising different metals.

Advantageously, the isolating film is flexible.

Alternatively, the isolating film advantageously is rigid and is mounted in the crimping groove or on the crimping edge.

Such a film can be produced extemporaneously by applying an electrically isolating material, for example a material in the liquid state, to the crimping edge just before the step of magnetic crimping.

Advantageously and according to the invention, the crimping groove is distorted. In other words, the crimping groove is not rectilinear and has at least one angle or a curve. The assembly of two distorted parts, i.e. parts that are not plates, according to a method according to the invention, is particularly traction resistant.

Advantageously and according to the invention, the crimping edge of the first part is an end of the first part, in particular an end in the direction of traction.

Advantageously and according to the invention, the crimping edge of the first part is a tab. The tab is particularly adapted, i.e. of suitable width and shape, to be able to be introduced into the crimping groove. Advantageously, a tab is part of the first part that forms a crimping edge of the first part. The thickness of such a tab is much lower than its two other dimensions. Therefore, the crimping edge can have a plurality of tabs introduced into the crimping groove or even a single tab forming a continuous crimping edge over the entire length of the crimping groove.

The crimping edge of the first part is a wall.

More specifically, the first part advantageously has a smaller dimension, called thickness, that is introduced into the width of the crimping groove. Therefore, the first part is a wall. For example, the first part is a cylinder, a plate, a parallelepiped, etc.

Furthermore, advantageously and according to the invention, the crimping edge is a wall with a closed contour.

In particularly advantageous embodiments of the invention, the first part therefore is a receptacle that is open or closed at an end opposite the end forming the crimping edge.

Therefore, the crimping groove advantageously also has a closed contour in order to be able to receive the crimping edge of the first part.

The crimping stop in these embodiments is inclined so that the foot of the crimping stop located in the vicinity of the bottom of the crimping groove is further towards the outside of the closed contour than the edge of the crimping stop located at the opening of the crimping groove.

Once crimped in the crimping groove of the second part, the crimping edge of the first part therefore has a crimping edge that flares out towards the bottom of the crimping groove.

More specifically, when the first part is a wall with a closed contour that is symmetric relative to an axis of symmetry, the direction of traction is parallel to the axis of symmetry of the first part.

Advantageously and as claimed in the invention, the first part is rotationally symmetrical about an axis of symmetry. The direction of traction is parallel to said axis of symmetry.

More specifically, advantageously and as claimed in the invention, the first part is a rotationally cylindrical wall about an axis of symmetry parallel to the direction of traction.

A method according to the invention advantageously allows cylindrical receptacles to be crimped. A method according to the invention particularly allows cylindrical or more complex shaped receptacles to be crimped in one attempt and in a reliable manner.

To this end, advantageously and as claimed in the invention, the second part has a crimping groove and a crimping lip that are rotationally symmetrical about an axis of symmetry parallel to the direction of traction.

Furthermore, advantageously the second part is a disc, so that it allows the end of a first part to be closed. In particular, the second part forms the cover or the base of a first cylindrical part, in particular a cylinder forming a receptacle. Of course, it also allows receptacles to be closed at atmospheric pressure.

A method according to the invention therefore allows a cylindrical receptacle to be closed in order to form a container intended to store pressurised fluids or a partial vacuum.

Advantageously, the diameter of the bottom of the circular crimping groove is greater than or equal to the diameter of the cylindrical crimping edge of the first part.

More specifically, advantageously and as claimed in the invention, the first part has a crimping edge of frustoconical shape about an axis of symmetry parallel to the direction of traction.

Furthermore, advantageously and as claimed in the invention, the crimping stop has a frustoconical surface about an axis of symmetry parallel to the direction of traction, with an apex equal to the apex of the frustoconical shaped crimping edge of the first part.

The crimping edge of the first part is advantageously designed to make contact with the crimping stop during the step of introducing the crimping edge into the crimping groove. The crimping edge has at least one surface portion that complements the crimping stop.

The crimping edge is particularly outwardly frustoconical relative to the body of the first part. This allows the crimping edge to be in contact with the crimping stop and to be inserted into the crimping groove. The first part therefore has a trumpet-like end.

Thus, the first part is not deformed under the crimping effect of the crimping lip: the crimping edge is already in contact with the crimping stop before the crimping step. Such a feature is particularly advantageous in the case of a first part that is made of a highly rigid material and that would badly or unevenly deform under the folding effect of the crimping lip and, in the case of a first part made from a fragile material, would break under the folding effect of the crimping lip.

Furthermore, advantageously and as claimed in the invention, the magnetic field generator is disposed opposite the crimping lip, offset in the direction of traction relative to the crimping lip, so that at least part of the magnetic field generator is disposed beyond a free end of the crimping lip.

Said part of the magnetic field generator that is disposed beyond the free end of the crimping lip therefore is not opposite the crimping lip, but is directly opposite the first part. Thus, the free end of the crimping lip is immersed in an intense and even magnetic field during the step of magnetic crimping.

The combination of having the bottom of the crimping groove nearly as thick as the crimping edge and of this arrangement of the magnetic field generator relative to the crimping lip allows the friction between the free end of the crimping lip and the crimping edge to be minimised. Therefore, potential damage of the crimping edge during magnetic crimping is minimised. Furthermore, this allows a film to be interposed between the crimping edge and the crimping groove without this film being torn by the free end of the crimping lip during magnetic crimping.

More specifically, advantageously and according to the invention:
  the magnetic crimping is realised with a magnetic field generator that is rotationally symmetrical about an axis of symmetry and with a plane of symmetry that is orthogonal to said axis of symmetry;
  the magnetic field generator is radially disposed about the crimping lip, offset in the direction of traction relative to the crimping lip, so that the plane of symmetry of the magnetic field generator is axially (along the axis of symmetry of the magnetic field generator) beyond a mid-plane of the crimping lip.

The crimping lip has a mid-plane extending midway between the foot of the crimping lip and the free end of the crimping lip. The mid-plane extends midway between the bottom of the crimping groove and the free end of the crimping lip.

Such an arrangement is particularly advantageous when the first and the second part are rotationally cylindrical, particularly when the crimping edge and the crimping lip are rotationally cylindrical about an axis of symmetry. In this case, the rotational axis of symmetry of the magnetic field generator is advantageously disposed so that it coincides with the axes of symmetry of the first and the second part.

Such a feature improves the magnetic crimping of the magnetic lip onto the crimping edge. In particular, it ensures that the free end of the crimping lip is correctly radially driven. It allows quality crimping to be obtained, while minimising the friction between the free end of the crimping lip and the crimping edge during crimping.

In a method according to the invention, during the step of magnetic crimping, the magnetic field generator has a portion axially located beyond the free end of the crimping lip that measures between 10% and 25% of the length of the crimping lip.

The magnetic field generator advantageously comprises an electric coil generating a magnetic field oriented along its axis of symmetry inside said coil. The magnetic field generator can further comprise a magnetic field concentrator.

The invention further relates to an assembly of at least two parts that have been crimped together according to a method according to the invention.

The invention particularly relates to an assembly, in at least one direction, called direction of traction, comprising:
  at least one first part having an edge, called crimping edge, extending to an end of said first part in the direction of traction,
  at least one second part having:
    a lip, called crimping lip, at least partly made up of an electrically conducting material;
    a stop, called crimping stop, extending opposite and remote from a side of the crimping lip, providing a groove, called crimping groove:
  the crimping lip being evenly crimped onto the crimping edge so that the crimping edge is clamped in the crimping groove between the crimping stop and the crimping lip,
  wherein the crimping stop has at least one portion that is inclined relative to the direction of traction.

More specifically, the invention relates to an assembly, in at least one direction, called direction of traction, comprising:
  at least one first part having an edge, called crimping edge, extending to an end of said first part in the direction of traction,
  at least one second part having:
    a lip, called crimping lip, at least partly made up of an electrically conducting material;
    a stop, called crimping stop, extending opposite and remote from an inner side of the crimping lip, providing a groove, called crimping groove:
  the crimping lip being evenly crimped onto the crimping edge so that part of said crimping edge is clamped in the crimping groove between the crimping stop and the crimping lip,
  wherein the crimping stop has at least one portion that is inclined relative to the direction of traction and wherein part of said crimping edge is clamped between:
    a face, called inner face, of the second part, said inner face being distinct from the crimping stop; and
    a free end of the crimping lip folded against said inner face, so that the crimping edge has a stop with said inner face and a stop with said inner side of the free end of the crimping lip.

Advantageously, the crimping lip is evenly crimped onto the crimping edge using a magnetic crimping operation. Indeed, only magnetic crimping allows perfectly even crimping to be obtained. More specifically, the crimping lip is advantageously free from crimping marks.

Furthermore, in an assembly as claimed in the invention, said inner face is advantageously orthogonal to the direction of traction.

Furthermore, advantageously and as claimed in the invention, the stop between the crimping edge and the inner face is orthogonal to the direction of traction, and the stop between the crimping edge and the free end of the crimping lip is orthogonal to the direction of traction.

An assembly according to the invention advantageously further comprises a film comprising at least one layer of electrically isolating material interposed between the first part and the second part.

Advantageously, the film is formed by a dielectric polymer material. Such an isolating film allows the first part to be electrically isolated from the second part. Such a film also allows oxidation-reduction reactions to be avoided between the first and the second part, thus allowing assemblies to be produced in which the first part and the second part are made of metallic materials comprising different metals.

The invention further relates to a method and an assembly characterised in combination by all or part of the features mentioned above or hereafter. In particular, the invention further relates to an assembly obtained by all or part of the features of a method according to the invention.

Further objects, features and advantages of the invention will become apparent upon reading the following description, which is provided by way of non-limiting example, and with reference to the appended drawings, wherein:

FIG. 2a is a detailed drawing, as shown in FIG. 1, of the assembly zone of a first part and of a second part according to a first embodiment according to the invention, before the step of magnetic crimping;

FIG. 2b is a drawing according to FIG. 2a, after the step of magnetic crimping;

FIG. 3 is a detailed drawing, as shown in FIG. 1, of the assembly zone of a first part and of a second part according to a second embodiment according to the invention, before the step of magnetic crimping;

FIG. 4 is a detailed drawing, as shown in FIG. 1, of the assembly zone of a first part and of a second part according to a third embodiment according to the invention, before the step of magnetic crimping;

FIG. 5 is a detailed drawing, as shown in FIG. 1, of the assembly zone of a first part and of a second part according to a fourth embodiment according to the invention, before the step of magnetic crimping;

FIG. 6 is a detailed drawing, as shown in FIG. 1, of the assembly zone of a first part and of a second part according to a fifth embodiment according to the invention, before the step of magnetic crimping;

FIG. 7 is a detailed drawing showing the assembly zone of a first part and of a second part and the advantageous arrangement of a magnetic field generator relative to the crimping lip.

Figure 1:
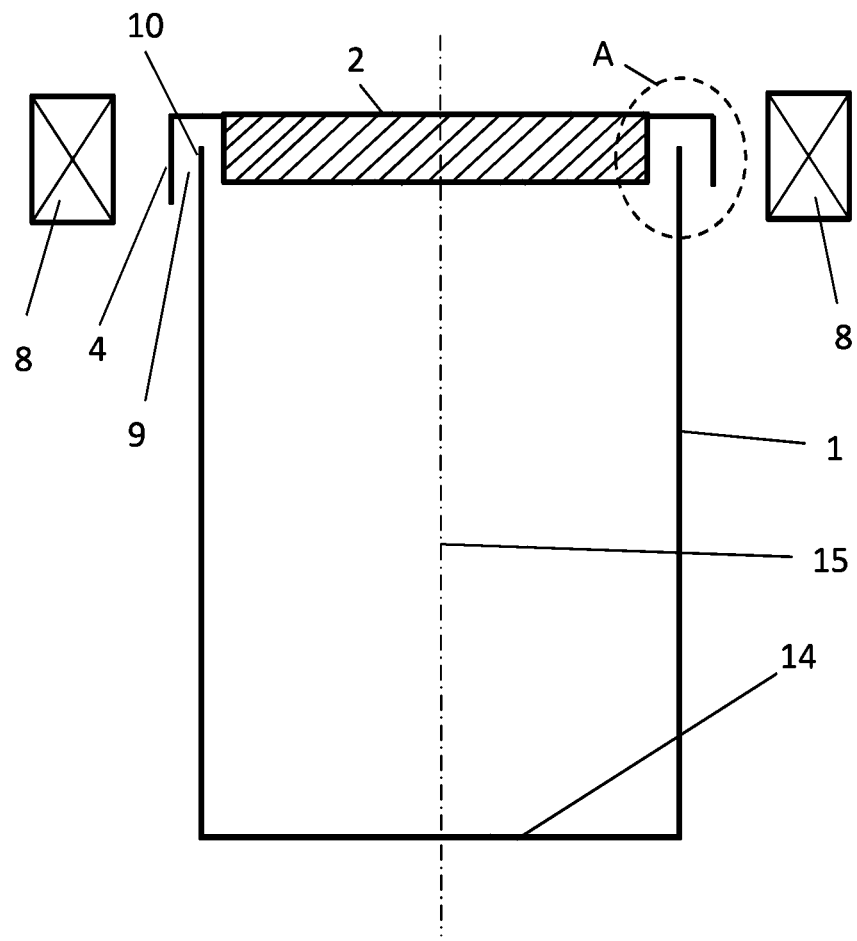
FIG. 1 is a schematic representation of an assembly as a longitudinal section view according to one embodiment according to the invention.

In the embodiments shown, the first part is a receptacle 1 with a closed contour, more specifically rotationally cylindrical, closed by a base 14 at one of its ends along its axis of symmetry 15 and open at the second of its two ends along its axis of symmetry. The object is to close the open end 10 of this receptacle 1 using a second part, which is a cover 2.

In a method according to the invention, the open end, or crimping edge 10, of the receptacle 1 is introduced into a crimping groove 9 provided in a face, called inner face 16, of the cover 2. The shape and width of the crimping groove 9 are adapted to be able to be introduced into the crimping edge 10 of the receptacle 1. The crimping groove 9 is provided in a solid cover 2.

The cover 2 is also rotationally symmetrical about an axis of symmetry that coincides with the axis of symmetry 15 of the receptacle 1 when the crimping edge 10 of the receptacle 1 is introduced into the crimping groove 9 of the cover 2, as shown in FIG. 1.

The assembly between the receptacle and the cover can be expected to undergo traction forces mainly in a direction parallel to the axis of symmetry 15, in particular when the container obtained by assembling the receptacle 1 and the cover 2 contains a pressurised fluid or a partial vacuum relative to the external pressure.

The crimping groove 9 is provided in the vicinity of the peripheral edge of the cover 2 so that said cover has a crimping lip 4 between the crimping groove 9 and its outer peripheral edge.

The assembly zone A between the receptacle 1 and the cover 2 is magnified and is shown as a cross-section in FIGS. 2a, 2b, 3a, 3b, 4, 5 and 6, which represent various embodiments of the invention.

FIGS. 2a and 2b show a first embodiment according to the invention.

In this embodiment, the crimping lip 4 substantially extends in a direction parallel to the axis of symmetry (along a generating line about said axis of symmetry). The width of the crimping lip is constant between its area of attachment with the rest of the cover and its free end.

The crimping groove 9 has a trapezoidal profile. Indeed, the crimping stop 3 is oblique relative to the axis of symmetry 15. The crimping stop 3 is a frustoconical surface with the same axis of symmetry as that of the cover 2 and with a summit that is on the side of the crimping groove relative to the cover. Therefore, the opening of the crimping groove is wider than the bottom of the crimping groove.

The bottom of the crimping groove 9 has the same diameter as the crimping edge 10 of the receptacle, which is a rotationally cylindrical wall. Furthermore, the width of the bottom of the crimping groove 9 is substantially equal to the thickness of the crimping edge 10 so that, after crimping, no radial space remains between the crimping edge and the sides (crimping stop, on the one hand, and crimping lip, on the other hand) of the crimping groove.

FIG. 2b shows the assembly obtained after a step of magnetic crimping is applied to the assembly of FIG. 2a. The space between the crimping edge 10 and the crimping groove 9 is only provided to better understand the drawing. The faces of the crimping edge 10 and of the crimping groove 9 are actually in contact over their entire surface.

Magnetic crimping is realised by applying a magnetic pulse, i.e. by applying a short and intense magnetic field variation to the crimping lip 4. To this end, as shown in FIG. 1, the assembly zone between the receptacle 1 and the cover 2 is introduced into a coil 8 that surrounds the cover 2, in particular that surrounds the crimping lip 4.

More specifically, as shown in FIG. 7, a coil 8 is radially disposed about the crimping lip 4, opposite said lip but without touching said lip The crimping lip 4 has a mid-plane 19 located between the bottom of the groove 3 and the free end 12 of the crimping lip.

The coil has a plane of symmetry 17 that is disposed beyond the mid-plane 19 of the lip 4 so that the lower edge 18 of the coil is axially disposed (along the axis of symmetry 15) beyond, at a distance d, the free end 12 of the crimping lip.

During crimping, the crimping lip 4 is radially driven inwards towards the crimping stop. The Laplace force experienced by the crimping lip is sufficient for it to gain sufficient kinetic energy to be able to drive the crimping edge 10 of the receptacle until it makes contact with the crimping stop 3, radially deforming the receptacle 1.

FIG. 2b shows the particularly advantageous assembly obtained by a method according to the invention. The crimping edge 10 is clamped between the crimping lip and the crimping stop.

The frustoconical crimping stop 3 is in surface contact with the crimping edge 10, so as to be able to withstand a traction force in a direction parallel to the axis of symmetry 15 that tends to axially bring together the receptacle 1 and the cover 2. In the same way, the crimping lip 4 is in contact along a frustoconical shaped surface with the crimping edge 10, so as to be able to withstand a traction force in a direction parallel to the axis of symmetry 15 that tends to axially separate the receptacle 1 from the cover 2. These frustoconical shaped contact surfaces allow the assembly to withstand much greater axial forces than with straight crimping, in which only the friction forces between the crimping edge and the crimping groove allow the receptacle and the cover to remain assembled.

After magnetic crimping, the receptacle 1 has deformations 11 in the vicinity of the crimping edge 10, in particular the receptacle has a groove just below the cover 2. After crimping, the cover 2 has a frustoconical shaped peripheral surface.

The magnetic crimping of such an assembly allows the crimping operation to be carried out in one attempt and in a uniform manner around the entire assembly zone between the receptacle and the cover. Therefore, such crimping is particularly reliable. Such a method for crimping is also particularly quick, allowing a high rate of production of assemblies according to the invention. Such a method for crimping according to the invention also can be quickly adapted to other shapes of first and second parts as it does not require the design, production and assembly of a new crimping tool for each new cover shape.

Furthermore, by virtue of magnetic crimping, the second part, in particular the crimping lip, does not have crimping marks resulting from tooling impacting the metal. Advantageously, the crimping lip is free from crimping marks. Therefore, such a method allows assemblies to be obtained with remarkable surface aesthetics.

Furthermore, in the groove formed in the vicinity of the crimping edge of the first part, the passage of a crimping tool is difficult and even impossible to implement. Indeed, this groove is generally narrow and mechanical crimping involves the passage of tooling, which would involve simultaneously impacting the first part, thus degrading its external appearance. However, magnetic crimping does not impose any geometric constraint and can be perfectly implemented in the examples shown. It is therefore essential for magnetic crimping to be selected when implementing a method according to the invention.

Furthermore, as claimed in the invention, the crimping lip 4 is longer than the depth of the crimping groove 9 so that its free end 12 is beyond the edge of the crimping groove, i.e. beyond the inner face 16 of the cover 2. For example, this is shown in FIG. 2*a* using a profile view in a longitudinal section through a plane comprising the axis of symmetry of the receptacle 1.

Therefore, when magnetically crimping the cover onto the receptacle, the crimping edge 10 is partly clamped between the frustoconical crimping stop and the crimping lip, but it is also partly clamped between the inner face 16 and the free end 12 of the crimping lip 4. Indeed, as the free end 12 of the crimping lip 4 is not opposite the crimping stop, it continued its course under the effect of the magnetic pulse until it is folded against the inner face 16 of the cover.

Again, the magnetic crimping technique is particularly advantageous as it allows the crimping lip to be crimped in one attempt, which would not have been the case with mechanical crimping. Magnetic crimping also ensures that the receptacle is not impacted at any time by a mechanical part other than the crimping lip.

The assembly obtained by such an embodiment is particularly advantageous as it allows the resistance to relative traction forces between the receptacle 1 and the cover 2 to be increased. Indeed, the crimping edge 10 has a plurality of deformations 11 and has annular stops with the inner face 16 of the cover 2, on the one hand, and with the inner side of the free end 12 of the crimping lip 4, on the other hand. Thus, these stops are substantially orthogonal to the axis of symmetry and therefore to the direction of traction along which a pressurised gas or a partial vacuum would tend to axially separate or axially approach the cover 2 from/to the receptacle 1.

FIG. 3 shows a second embodiment compatible with the first embodiment, before crimping.

In this embodiment, an additional step is added to the method before introducing the crimping edge 10 into the crimping groove 9. During this step, a flexible film 5 is interposed between the crimping edge 10 and the crimping groove 9 (or between the receptacle 1 and the cover 2, more generally).

Advantageously, this film 5 fully extends into the crimping groove 9 and along the entire length of the crimping lip, so that the assembly obtained between the receptacle and the cover does not have any zone that is in direct contact between the receptacle and the cover.

Such a film 5 improves the seal that is obtained when magnetically crimping between the crimping edge 10 and the crimping groove 9. Indeed, the film 5 is compressed between the crimping edge and the crimping groove after crimping, so that it provides a perfect seal by filling any void or surface defect that can remain between the crimping edge and the crimping groove.

Such a film 5 is advantageously selected so that it is electrically isolating. Therefore, it allows oxidation-reduction reactions to be avoided between the receptacle and the cover when they are made up of distinct metallic materials.

Such a film 5 is selected, for example, from an elastomer that is approximately 0.2 to 0.3 mm thick.

FIG. 4 shows a third embodiment that is compatible with the first and second embodiments, before crimping.

In this embodiment, a moulded part 6 is mounted on the crimping edge 10 before it is introduced into the crimping groove 9.

Such a moulded part also improves the seal of the assembly and electrically isolates the receptacle from the cover.

This moulded part 6 advantageously replaces the film 5 disclosed in the preceding embodiment. However, there is nothing preventing the combined assembly of a moulded part 6 on the crimping edge 10 and a film 5 interposed between the moulded part 6 and the crimping groove 9.

For example, the moulded part is selected from a flexible thermoplastic, for example from EPDM (Ethylene Propylene Diene Monomer). The moulded part can be produced in various ways: for example, it can be manufactured using a standard mould, then mounted onto the crimping edge or it can even be moulded directly onto the crimping edge by overmoulding, by encapsulation or by coating on the crimping edge 10.

FIG. 5 shows a fourth embodiment that is compatible with the first, second and third embodiments, before crimping.

In this embodiment, the crimping stop has a slot for the assembly of a seal 7.

Such a seal 7 improves the impermeability obtained when magnetically crimping between the crimping edge 10 and the crimping groove 9. Indeed, the seal 7 is compressed between the crimping edge and the crimping stop after crimping.

This seal 7 advantageously replaces the film 5 and/or the moulded part 6 disclosed in the preceding embodiments. However, there is nothing preventing the combined assembly of a seal 7, in a slot machined in the crimping stop, with a moulded part 6 on the crimping edge 10 and/or a film 5 interposed between the moulded part 6 and the crimping groove 9.

Such a seal 7 is an elastomer, for example a fluoroelastomer made of VITON®, for example.

FIG. 6 shows a fifth embodiment compatible with the third and fourth embodiments, before crimping.

In this embodiment, the receptacle is rotationally cylindrical, but the crimping edge 10 is frustoconical. More specifically, the crimping edge has a frustoconical shape flaring out of the open end of the receptacle. Furthermore, the crimping edge is frustoconical with an apex (of the cone on which it is located) that is substantially equal to that of the crimping stop.

Therefore, when the crimping edge 10 is introduced into the crimping groove 9, it is in direct contact with the crimping stop 3. During the step of magnetic crimping, the crimping edge, and especially the receptacle, is not deformed; only the crimping lip 4 is deformed. Indeed, the crimping lip is folded over the crimping edge but, with the crimping edge 10 already being in abutment against the crimping stop 3, its upper portion is neither driven nor deformed by the impact of the crimping lip (with the exception of a possible light compression towards the thickness of the crimping edge); only a portion of the crimping edge, that is impacted by the free end of the crimping lip, is deformed beneath the inner face 16.

Such an embodiment is particularly advantageous when the receptacle material is not very malleable. Indeed, if the receptacle 1 material is too hard, there is a risk that the crimping will be imperfect as the crimping lip 4 would not have enough kinetic energy to deform the crimping edge until it is clamped between the crimping lip and the crimping stop.

Similarly, such an embodiment is particularly advantageous when the receptacle 1 material is fragile and when there is a risk of the crimping edge breaking instead of being deformed during crimping.

Similarly, the crimping lip 4 is advantageously made from a plastically deformable material so that it does not break under the effect of the magnetic pulse imposed by a magnetic crimping coil 8.

According to the document, "OPERATING DESCRIPTION FOR A MACHINE FOR WELDING, FORMING, CUTTING OR ASSEMBLING USING MAGNETIC PULSES", Gaille et al, Doc. IX-513-01, Swiss Welding Institute (SWI), skin thickness δ is determined by the formula:

$$\delta = \sqrt{\frac{2}{\omega \mu \sigma}} \ [m]$$

where ω is the pulse of the imposed magnetic field;
σ is the electrical conductivity of the crimping lip;
μ is the absolute magnetic permeability of the crimping lip, with $\mu = \mu_0 \mu_r$, with $\mu_0$ being the magnetic permeability of the vacuum and $\mu_r$ being the relative magnetic permeability of the crimping lip.

According to the same document, the pressure p(t) experienced by the crimping lip over time is therefore determined by the formula:

$$p(t) = \frac{B^2(t)}{2\mu} \ [Pa = N/m^2]$$

where B(t) is the intensity of the imposed magnetic field.

Therefore, a second part is selected, the crimping lip of which has features that are suitable for efficient and reliable magnetic crimping. In particular, the electrical conductivity and the magnetic permeability of the crimping lip are selected.

By way of example, a receptacle as shown in the first embodiments according to the invention is made of aluminium (and therefore so is the crimping edge) and the cover is made of copper (and therefore so is the crimping lip). In the final embodiment, the receptacle is made of steel.

The receptacle wall (and therefore the crimping edge) is approximately 1 mm thick and the crimping lip is approximately 1 mm thick. The diameter of the receptacle, and therefore of the crimping groove, is approximately 30 mm in this particular embodiment, and is more than 30 mm in other embodiments. However, there is nothing preventing the implementation of a method according to the invention on a receptacle with a diameter of less than 30 mm.

Furthermore, the apex of the crimping stop is approximately 30° to 45°.

The magnetic pulse generated for the step of magnetic crimping implements approximately 3 kJ of energy for approximately 15 microseconds. The coil 8 is disposed offset along the axis of symmetry 15 so that the distance d between the free end 12 of the crimping lip and the lower edge of the coil 8 is of the order of 3 mm, this particularly ensures that the free end of the crimping lip is effectively folded against the inner face during magnetic crimping. The distance between portions opposite the crimping lip 4 and the coil 8 is of the order of 1 mm.

Therefore, a container obtained by magnetically crimping such a cover onto a receptacle withstands pressure differences of more than 9 bar between the inside and the outside, i.e. pressures of at least 10 bar inside the container.

The invention can be the object of various other variants of embodiments that are not shown.

For example, the invention allows assemblies to be created with a second part on a first hollow part with a distinct cylinder profile, for example a triangular, parallelepiped, pentagonal, hexagonal, octagonal or any type of profile. Magnetic crimping is particularly advantageous as it allows the reliable crimping of any type of shape in one attempt and without requiring tooling changes.

The invention also allows the end-to-end crimping of two tubes, for example.

The crimping stop can have other shapes so that the crimping groove is not necessarily of trapezoidal profile, as long as it allows contact coverage to be obtained that is inclined relative to a direction of traction between the crimping edge and the crimping stop and between the crimping edge and the crimping lip.

Various types of materials can be selected for the cover, and even more can be selected for the receptacle, which is not necessarily electrically conducting.

Furthermore, there is nothing preventing the second part from actually being made up of at least two parts: for example, a plug having crimping stops on its periphery and a closure, into which the plug is introduced, with the shape of said closure being adapted to form a crimping lip opposite the periphery of the plug. Therefore, for example, said plug can be truncated and said closure can be cylindrical and closed at an end that is intended to come into contact with the larger of the two faces of the plug.

The invention claimed is:

1. A method for assembling, in at least one direction of traction (15), comprising:
   providing a first part (1) having a crimping edge (10), extending to an end of said first part (1) in said direction of traction (15);
   providing a second part (2) having:
      a crimping lip (4), at least partly made up of an electrically conducting material;
      a crimping stop (3), extending opposite and remote from an inner side of said crimping lip (4);
      a crimping groove (9), wherein said crimping groove (9) is open in said direction of traction (15) and adapted to receive said crimping edge (10) of said first part (1);
   wherein:
   said crimping edge (10) of said first part (1) is introduced into said crimping groove (9) of said second part (2) in said direction of traction (15);
   then magnetic crimping is carried out by applying a magnetic field variation to said crimping lip (4) that is adapted to fold said crimping lip (4) without winding and to plastically deform said crimping lip (4) towards said crimping stop (3), so as to close said crimping groove (9) onto said crimping edge (10) of said first part (1);
   wherein:
   said crimping stop (3) has at least one portion that is inclined relative to said direction of traction (15);
   said crimping lip (4) is longer than the depth of said crimping groove (9);
   during magnetic crimping a free end (12) of said crimping lip (4) is folded against an inner face (16), of said second part (2), said inner face (16) being distinct from said crimping stop (3), said crimping edge (10) is deformed between said inner face (16) and said free end (12) of said crimping lip (4), so that said crimping edge (10) has a portion in abutment against said inner face (16), on one side, and in abutment against said free end (12) of said crimping lip (4), on the opposite side.

2. The method as claimed in claim 1, wherein:
   said first part (1) is a rotationally cylindrical wall about an axis of symmetry parallel to said direction of traction;

said second part (2) has said crimping groove (9) and said crimping lip (4) that are rotationally symmetrical about an axis of symmetry parallel to said direction of traction.

3. The method as claimed in claim 2, wherein said first part (1) has said crimping edge of frustoconical shape about an axis of symmetry parallel to said direction of traction (15).

4. The method as claimed in claim 3, wherein said crimping stop (3) has a generally frustoconical surface about an axis of symmetry parallel to said direction of traction (15), with an apex equal to the apex of said frustoconical crimping edge (10) of said first part (1).

5. The method as claimed in claim 1, wherein said inner face (16) comprises at least one flat portion orthogonal to said direction of traction (15), said flat portion receiving said free end of said crimping lip during crimping.

6. The method as claimed in claim 5, wherein an annular stop between said crimping edge (10) and said inner face (16) is orthogonal to said direction of traction (15), and wherein an annular stop between said crimping edge (10) and said free end (12) of said crimping lip (4) is orthogonal to said direction of traction (15).

7. The method as claimed in claim 1, wherein a film (5) is interposed between said crimping edge (10) and said crimping groove (9).

8. The method as claimed in claim 7, wherein said film (5) comprises at least one layer of electrically isolating material.

9. The method as claimed in claim 1, wherein an annular stop between said crimping edge (10) and said inner face (16) is orthogonal to said direction of traction (15), and wherein an annular stop between said crimping edge (10) and said free end (12) of said crimping lip (4) is orthogonal to said direction of traction (15).

10. The method as claimed in claim 1, wherein said crimping stop (3) is oriented in a direction forming an angle different from 90° with said direction of traction (15).

11. The method as claimed in claim 1, wherein said crimping groove (9) has a trapezoidal profile.

12. The method as claimed in claim 1, wherein, during magnetic crimping, a magnetic field generator (8) is disposed opposite of said crimping lip (4), offset in said direction of traction (15) relative to said crimping lip (4), so that at least part of said magnetic field generator is beyond said free end (12) of said crimping lip (4).

* * * * *